(12) United States Patent
Takeuchi

(10) Patent No.: US 6,475,666 B1
(45) Date of Patent: *Nov. 5, 2002

(54) THERMAL PROTECTION SEPARATOR FOR ALKALI METAL BATTERIES

(75) Inventor: Esther S. Takeuchi, Williamsville, NY (US)

(73) Assignee: Wilson Greatbatch Ltd., Clarence, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 908 days.

(21) Appl. No.: 08/801,006

(22) Filed: Feb. 19, 1997

Related U.S. Application Data (63) Continuation of application No. 07/848,287, filed on Mar. 9, 1992, now abandoned, which is a continuation-in-part of application No. 07/668,592, filed on Mar. 13, 1991, now abandoned.

(51) Int. Cl.$^7$ .............................................. H01M 2/18
(52) U.S. Cl. ................... 429/144; 429/145; 429/142; 429/62
(58) Field of Search .................. 429/62, 142, 144, 429/145

(56) References Cited

U.S. PATENT DOCUMENTS

| | | | | |
|---|---|---|---|---|
| 4,650,730 A | * | 3/1987 | Lundquist et al. | ............ 429/62 |
| 4,830,940 A | * | 5/1989 | Keister et al. | |
| 4,973,532 A | * | 11/1990 | Taskier et al. | ................ 429/62 |

* cited by examiner

*Primary Examiner*—Carol Chaney
*Assistant Examiner*—Tracy Dove
(74) *Attorney, Agent, or Firm*—Hodgson Russ LLP (57) ABSTRACT

A separator for shutting down current flow in a lithium or other alkali metal battery during a short circuit condition to prevent cell rupture. In one form, the separator comprises a layer of microporous polyethylene film, or other suitable microporous film having a melting point which is less than about 135° C., for providing good puncture resistance and for melting at a low temperature for increasing the margin of safety without significantly sacrificing performance. The separator also includes a layer of non-woven polypropylene, or other suitable non-woven material having a melting point which is at least about 10° C. higher than the melting point of the microporous film, to provide good strength and tear resistance so as to maintain physical integrity of the separator so that the short circuit condition is not worsened. In another form the separator comprises the combination of polyethylene on one of the battery electrodes, i.e. anode or cathode, and polypropylene on the other of the battery electrodes.

14 Claims, 4 Drawing Sheets

THERMAL PROTECTION SEPARATOR FOR ALKALI METAL BATTERIES

CROSS REFERENCE TO A RELATED APPLICATION

This is a continuation of application Ser. No. 07/848,287 filed on Mar. 9, 1992 abandoned as a continuation-in-part of Ser. No. 07/668,592 filed on Mar. 13, 1991 and now abandoned.

BACKGROUND OF THE INVENTION

The present invention relates generally to batteries. More particularly, the present invention relates to alkali metal batteries, i.e., batteries which have anodes which include as active material lithium, potassium, sodium, or another alkali metal of group IA of the Periodic Table or an alloy thereof.

Implantable cardiac defibrillators are used to prevent sudden death from lethal arrythmia. In operation, the defibrillator device continuously monitors the heart rate of the patient, is able to recognize ventricular fibrillation, and subsequently delivers high energy shocks to defibrillate the heart. Defibrillators are expected to function alone or in conjunction with a pacemaker. Thus, the power source must be of high capacity, low self-discharge, have good pulsing behavior, and be reliable. In addition, the implantable battery must deliver a current pulse and rapidly recover its open circuit voltage. In order to provide these operating characteristics, a lithium battery is considered to be a good power source.

The cathode of an alkali metal battery or cell is of a solid type and may have as active material thereof a suitable material such as, for example, carbon fluoride, a metal oxide, or a metal oxide bronze such as silver vanadium oxide, as disclosed in U.S. Pat. No. 4,830,940 to Keister et al, which patent is assigned to the assignee of the present invention and which patent is incorporated herein by reference. A "cell" is meant to refer to a battery or to a compartment thereof containing electrodes and electrolyte for generating electric current. The anode of such a battery or cell may be constructed in a serpentine fashion with cathode plates inserted between each of the convolutions thereof on both sides thereof. The electrolyte for an alkali metal battery or cell may be of the liquid organic type which comprises a suitable lithium salt and a suitable organic solvent. Both the anode and the cathode plates are usually incapsulated in an electrically insulative separator material.

Various kinds of separator material have been used for providing electrical insulation between the anode and cathode of various batteries. Examples of such separators are found in U.S. Pat. Nos. 4,741,979; 4,731,304; 4,650,730; 4,444,854; 4,288,503; 4,273,840; and 4,201,838. A separator commonly used in lithium batteries is a polypropylene laminate consisting of a non-woven layer of polypropylene and a membrane of polypropylene.

Safety problems may result due to external electrical or mechanical abuse or internal failures of lithium batteries. An internal or external short circuit causes the cell temperature to rise. If the internal cell temperature of a lithium battery reaches the lithium melting point of about 180° C., the melting of the lithium can result in rapid exothermic reactions that may cause catastrophic rupture of the cell. An approach to improving the abuse resistance of the cell so that such an event does not occur is by lowering the cell temperature during abuse conditions by preventing current flow, i.e., by providing what might be termed a "thermal fuse". In a thermal fuse, separator material melts to close up the pores therein or melts onto one or both of the electrodes so as to block the passage of ions in the solution between the electrodes and thereby shut down or partially shut down the battery after which it may begin to cool down or at least not increase further in temperature. If such cool down begins before the melting point of 180° C. of lithium is reached, catatrophic rupture of the cell may be avoided. In providing such a thermal fuse, it is therefore considered desirable to provide a greater margin of safety than is provided by the above-discussed polypropylene separator wherein the temperature must rise to a point in excess of about 150° C., the melting point of polypropylene, before thermal shut-down can even begin to occur.

U.S. Pat. Nos. 4,650,730 and 4,731,304 to Lunquist et al disclose a battery separator in the form of a multiply microporous sheet product wherein one ply is a sheet capable of transforming to a substantially non-porous membrane at a temperature between 80° C. and 150° C. while essentially maintaining its length and breadth dimensions and a second ply is a sheet capable of maintaining its dimensions and porosity at temperatures from ambient to at least about 10° C. greater than the transformation temperature of the first sheet for a purpose of preventing the occurence of overheating and thermal runaway in lithium batteries. The two sheets are bonded together to provide a unitary product. The polymeric compositions for each of the sheets is disclosed as being from classes of polymers capable of forming a microporous sheet such as polyolefins, polysulfones, polyvinyl chloride, polyvinyl fluoride, polycarbonates, and the like. As further disclosed therein, the polyolefin can be selected from homopolymers such as polyethylene or polypropylene or from various other polyolefins. Films disadvantageously tend to split along the machine direction to compromise the structural integrity of the separator and thus perhaps worsen a short circuit condition.

U.S. Pat. No. 4,741,979 to Faust et al discloses a composite separator for providing thermal protection in lithium batteries which comprises a thermal fuse and a film bearing the thermal fuse. The thermal fuse is disclosed as being prepared from a non-woven polyethylene coated polyester fabric which is coated with a wax material. It is indicated that the wax is intended to melt to form the thermal fuse. This layer of waxed fibers is disclosed as being pressure laminated to a microporous polypropylene film. It is disclosed that a wide varity of woven and non-woven fabrics including a polyethylene blend can be used as the film layer. Another separator assembly disclosed in Faust et al is a prelaminate of a non-woven polypropylene fabric and a microporous polypropylene onto which the wax is sprayed. The provision of such wax coatings to provide the thermal fuse do not lend to ease of manufacture of the separator.

SUMMARY OF THE INVENTION

It is considered desirable to provide an improved thermal protection separator for lithium and other alkali metal batteries. Among the attributes which such an improved separator desirably has is that it provide thermal shut down at a low temperature so that a large margin of safety against cell rupture can be achieved, that this large margin of safety be achieved without sacrifice of battery performance, and that the separator have good strength and tear and puncture resistance, so that the physical integrity of the separator may be maintained during short circuit conditions so that no gaps develop which may worsen the conditions. It is also desirable that the separator materials be such as to lend to ease of separator manufacture for reduced cost.

It is accordingly an object of the present invention to provide a thermal protection separator for a lithium battery as well as other alkali metal batteries which is reliable, easy to manufacture, provides an increased margin of safety without significantly sacrificing performance, and has good strength, tear resistance, and puncture resistance for maintaining its physical integrity for improved reliability.

In order to provide such an improved thermal protection separator for an alkali metal battery or cell, in accordance with one form of the present invention the thermal protection separator for an alkali metal battery or cell comprises a layer of microporous polyethylene film or other suitable microporous film having a melting point which is less than about 135° C. and a layer of non-woven polypropylene or other suitable non-woven material having a melting point which is at least about 10° C. higher than the melting point of the microporous film, wherein the microporous film provides a low melting point so that the margin of safety can be increased without significantly sacrificing performance and wherein improved reliability may be achieved by the microporous film providing good puncture resistance, and the non-woven mesh may provide good strength and tear resistance.

In another form of the present invention, the thermal protection separator comprises the combination of polyethylene on one of the cell electrodes and polypropylene on the other of the cell electrodes. The combination can be in various forms, for example both components can be film, i.e. microporous, or both can be nonwoven, one component can be film and the other non-woven, or one component can be film and the other a laminate film and non-woven. in addition to enhanced cell safety, advantages include a lower short circuit peak temperature on the cell or battery casing and avoidance of rupture on short circuit.

U.S. Pat. No. 4,273,840 to Machi et al, which is hereby incorporated herein by reference, discloses in example 2 thereof one type of separator which comprises a composite sheet consisting of non-woven cloth composed of polypropylene fibers and a polyethylene film for alkaline batteries, particularly zinc-silver oxide batteries using silver oxide or peroxide as cathode and zinc as anode, and nickel-zinc secondary batteries or other batteries using zinc as negative active material. Acrylic acid is grafted to the laminate sheet. Machi et al states that such a separator has a longer cycle-life than a cell using a separator composed of regenerated cellulose membrane and that cells using the separator required a smaller anode-to-cathode spacing which contributed to improved cell performance. Machi et al does not provide any teaching of suggestion relative to an improved thermal protection separator for a lithium or other alkali metal battery since the melting of the materials of the anode and cathode thereof does not result in the exothermic reactions that may cause rupture of a cell when lithium or another alkali metal melts. Thus, a thermal fuse would not be considered necessary in the battery of Machi et al, and one would therefore not consider Machi et al to be useful for providing any teaching relative to thermal fuses for lithium or other alkali metal batteries.

The above and other objects, features, and advantages of the present invention will be apparent in the following detailed description of the preferred embodiments thereof when read in conjunction with the accompanying drawings wherein like reference numerals denote like parts in the various views.

DETAILED DESCRIPTION OF THE PREFERRED EMBODIMENTS

Figure 1:
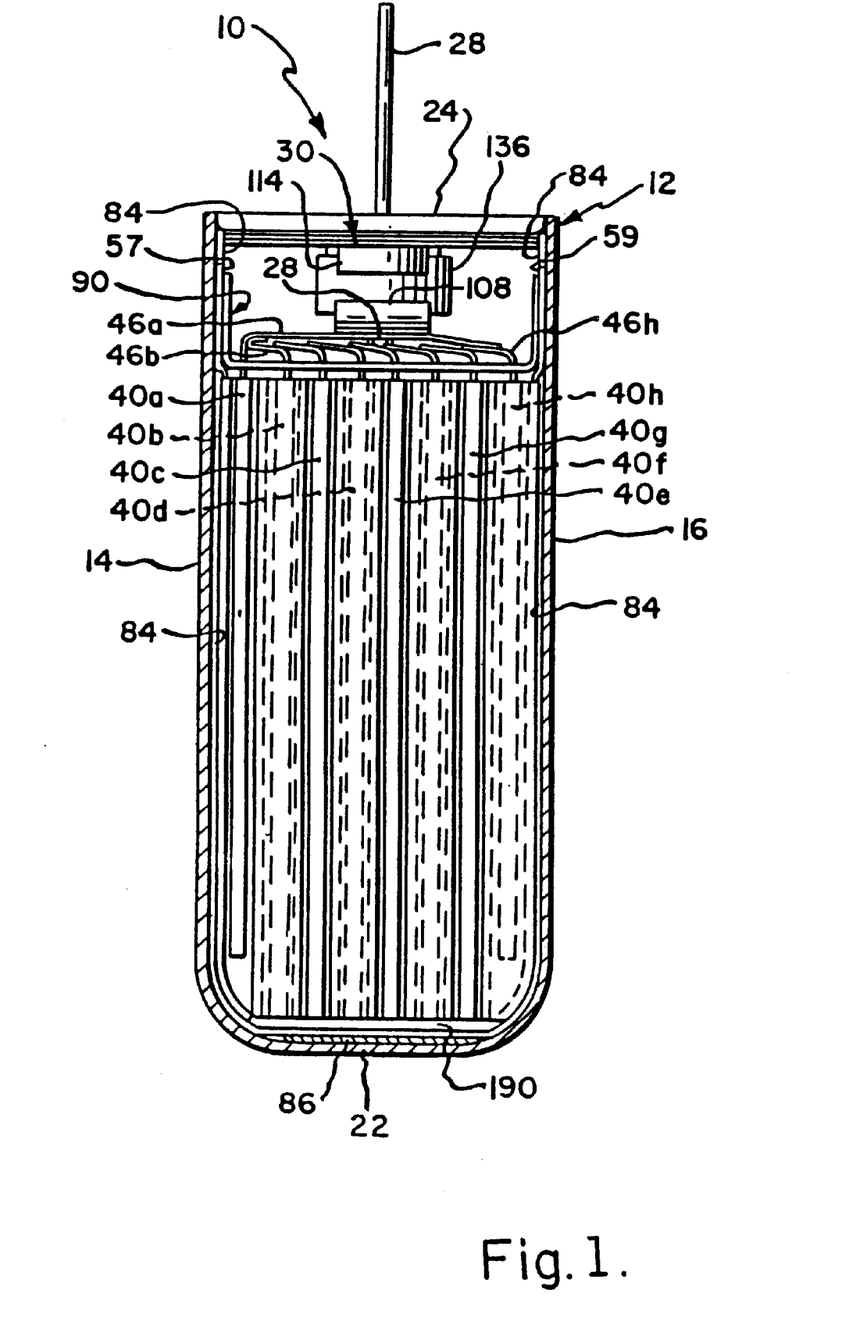
FIG. 1 is a sectional view of a battery which embodies one form of the present invention.

Referring to FIG. 1, there is shown a battery or cell 10 for delivering high current pulses and which may be used as a power source for an implantable cardiac defibrillator. Battery 10 includes a hollow casing 12 having spaced apart side walls 14 and 16, spaced apart end walls (not shown), and a bottom wall 22. Casing 12 is closed at the top by a lid 24 welded in place in a known manner. Casing 12 is of metal such as stainless steel and, being electrically conductive, provides one terminal or contact for making electrical connection between the battery and its load. Lid 24 may also be of stainless steel. The other electrical terminal or contact is provided by a conductor or pin 28 extending from within battery 10 through casing 12, i.e., through lid 24. Pin 28 is insulated electrically from the metal lid 24 by an insulator and seal structure 30. A fill opening (not shown) for electrolyte is also provided in the lid 24.

The battery 10 further includes cathode means 40 in casing 12 comprising a plurality of components or plates in spaced apart relation and also includes lithium anode means 42 comprising a plurality of anode sections interposed between the cathode plates. In battery 10 there are shown eight cathode plates 40a, 40b, 40c, 40d, 40e, 40f, 40g, and 40h. The cathode plates are arranged in casing 12 in spaced apart stacked relation and disposed substantially parallel to each other and to side walls 14 and 16 of the casing 12. The cathode means 40 contains as cathode active material silver vanadium oxide or any other suitable material preferably having a melting temperature at least equal to that of the anode material or which does not result in a cell rupturing exothermic reaction upon melting.

Figure 2:
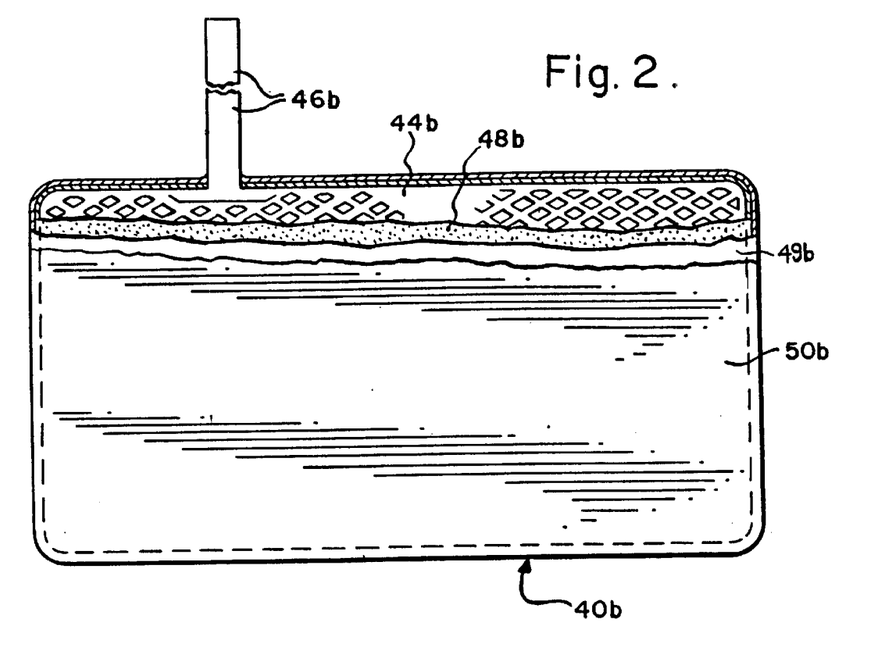
FIG. 2 is an elevational view, with parts removed, of one of the cathode plates of the battery of FIG. 1.

Referring to FIG. 2, there is shown one of the cathode components or plates, for example cathode component 40b. Cathode 40b comprises a cathode conductor including a body portion 44b and a lead portion 46b. Cathode 40b further comprises a body 48b of cathode mixture including cathode active material and binder. The cathode active material may be silver vanadium oxide, as previously described, and can include a binder such as Teflon material and can also include conductors such as graphite powder and acetylene black powder. In addition, the cathode mixture can contain an additive such as lithium salts, solid lithium ion conducting electrolyte, and surfactant. The mixture is pressed onto cathode conductor body portion 44b to form a pellet. The pellet is then enclosed in an envelope of separator material which according to this embodiment of the present invention is comprised of layers 49b and 50b, which will be described in greater detail hereinafter.

The anode means 42 comprises a generally elongated element or structure of lithium or lithium alloy enclosed within separator material which, according to this embodiment of the present invention, comprises a pair of layers 67 and 68 which will be described in greater detail hereinafter. As used herein and in the claims, "lithium" is meant to include alloys thereof, and "alkali metal" is meant to include alloys thereof. The anode means 42 is folded into a plurality of sections which are interposed between the cathode plates 40a to 40h. The anode means 42 is folded in a manner such that the sections thereof extend along both opposite sides of each of the cathode plates. Anode means 42 comprises an elongated continuous ribbon-like anode conductor element 54 in a form of thin metal screen, for example, nickel. Conductor 54 includes at least one terminal or contact tab extending therefrom, and in the battery shown there are four tabs 56, 57, 58, and 59 extending out from the same side edge of conductor 54 and arranged in two pairs, each pair being located in proximity to a corresponding one of the ends of conductor 54 and the tabs of each pair being spaced apart a distance less than the length of the corresponding casing side wall 14 and 16. Anode means 42 further comprises a pair of elongated ribbon-like lithium elements, one of which is shown at 62 in FIG. 3, pressed together against opposite sides of conductor element 54 to form the anode structure. The lithium elements are substantially equal in width and length to conductor element 54. The resulting anode structure is a sandwich-like construction with conductor 54 between the lithium elements. The layers 67 and 68 of separator material encapsulate the anode structure.

Figure 3:
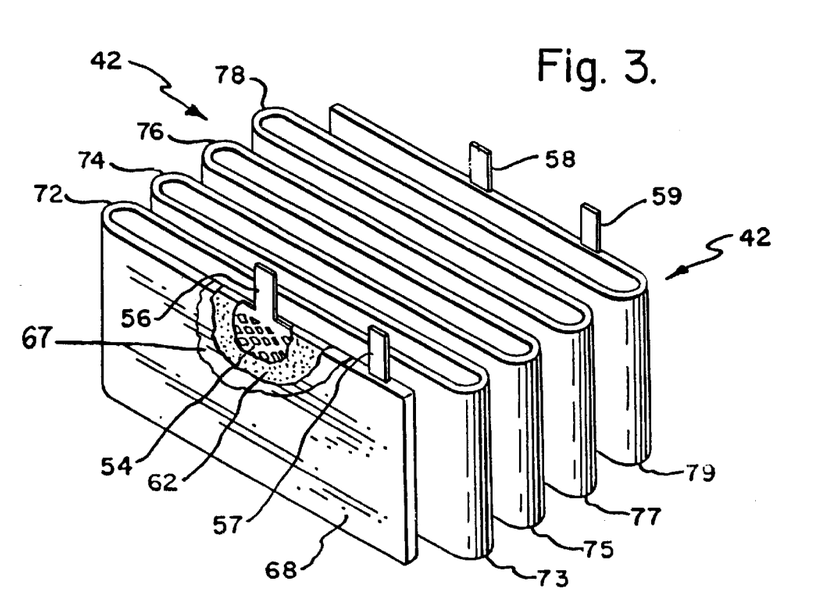
FIG. 3 is a perspective view, with parts removed, of the anode of the battery of FIG. 1.

The anode structure 42 is folded at spaced intervals along the length thereof to form a serpentine-like structure, as shown in FIG. 3, to receive between the folds thereof the plurality of cathode plates. Thus, the anode means 42 is folded at the intervals 72, 73, 74, 75, 76, 77, 78, and 79 along the length thereof. Cathode plate 40a is received between the folds or leaves in anode 42 defined about interval 72, cathode plate 40b is received between the folds defined about interval 73, and the remaining cathode plates 40c to 40h are received between the folds defined about the intervals 74 to 79 respectively. The folded anode structure 42 with cathode plates 40a to 40h received therein comprises a cell stack subassembly which is received in casing 12.

Cathodes 40a, 40b, and 40h have lead portions 46a, 46b, and 46h respectively, and the remaining cathodes also have lead portions which are interconnected, as shown in FIG. 1 and as described in greater detail in Keister et al. An intermediate lead 108 in the form of a ribbon or strip is fixed at one end to lead 46a and extends longitudinally relative to body 90 and casing 12 and is provided for connection to terminal pin 28 through the insulator and seal structure 30, which comprises a header or ferrule element 114 generally in the form of a cylindrical bushing of metal such as stainless steel. A pair of cell stack insulators 84 and 86 in the form of bands or strips extend along casing walls to prevent internal electrical short circuits. A cell stack insulating cover 90 is located in the casing 12 adjacent the upper surface of the cell stack and in spaced relation to the lid 24. The insulator and seal structure 30 includes an insulator element 136 in the form of a cup.

A liquid electrolyte, illustrated at 190 in FIG. 1, is introduced to casing 12 through a fill opening (not shown) in lid 24 in an amount sufficient to occupy at least the volume between anode 42 and cathode plates 40 and between the cell stack and the surrounding casing. The liquid electrolyte 190 is liquid organic fluid which comprises a lithium salt and an organic solvent.

While the separator means will be described in greater detail hereinafter, reference should be made to the aforesaid Keister et al patent for a more detailed description of the remainder of the battery 10, it being understood that the battery 10 can be embodied otherwise than as described therein without departing from the present invention as defined in the claims. For example, the cell may be of a type which is spirally wound as in a "jellyroll" configuration. Such other embodiments are thus meant to come within the scope of the present invention.

The melting point of lithium is about 180° C. As previously discussed, melting of the lithium can result in rapid exothermic reactions that cause rupture of the cell. The abuse resistance of a cell can be improved by lowering the cell temperature during abuse conditions by preventing current flow. The separator material, while electrically insulating the anode from the cathode, is sufficiently porous to allow electrolyte flow therethrough to contact both the anode and the cathode for carrying ions therebetween. One way of stopping the ion flow and thus preventing current flow is to cause at least one layer of the separator material to melt and thus close the pores thereof and/or coat the respective electrode. The cell internal temperature must be kept at a temperature lower than the lithium melting point temperature of 180° C. The lower the cell external temperature, which would be less than the cell internal temperature, the greater the margin of safety there would be. During the melting process, the physical integrity of the separator material should also be preserved so that no gaps or holes are formed therein which would cause ions to flow between the electrodes to worsen the short circuit condition. Thus, the separator material should have good strength and tear resistance while acting as a thermal fuse and should also have good puncture resistance. Furthermore, the materials selected for the separator to achieve the above characteristics should lend themselves to ease of manufacture, for example, be readily available and not involve an extra coating step.

In order to provide such a separator for a lithium battery, in accordance with this embodiment of the present invention the separator for the cathode 40b comprises an outer layer 50b composed of a microporous polyethylene film or sheet or other suitable microporous film for providing good puncture resistance and which has a low melting point of around 135° C. or less and also comprises an inner layer 49b of a non-woven polypropylene mesh, which has a melting point of about 150° C., or other suitable non-woven mesh having a melting point which is at least about 10° C. higher than the melting point of the microporous film material, for providing good strength and tear resistance to maintain, up to the non-woven mesh melting point of around 150° C., the physical integrity of the separator material as the inner layer melts to shut down the current flow. By the term "non-woven" is meant a mesh, as opposed to a film, wherein the fibers are bonded together such as by adhesive resins, rubber, or plastic or felted together under pressure. The term "non-woven" as applied to polypropylene and similar materials is a term well known in the art. The pore size for layer 50b should be such as to allow adequate ion flow between the electrodes but should not be increased substantially beyond this required size. The pore size can be selected using principles commonly known to those of ordinary skill in the art to which this invention pertains. For example, the pore size may typically be 0.02 micron.

Similarly, the anode 42 may be provided with a separator comprising an inner layer 67 similar to layer 49b and an outer layer 68 similar to layer 50b. However, it should be understood that, in accordance with this embodiment of the present invention, only one layer of the non-woven material and one layer of the microporous film are required between the electrodes, and the separator material may contain more than two layers of material as described herein for each electrode. For example, for a spirally wound cell, the separator comprising one layer of the non-woven material and one layer of the microporous film may be sandwiched between the anode and cathode and the assembly wound to form a "jellyroll-like" configuration. In such an assembly, neither electrode is encapsulated by the separator material.

Although the layers 49b and 50b and the layers 67 and 68 may be free-standing, they should be closely adjacent each other for support of the microporous film, and it is preferred that they be laminated together such as by a conventional localized heat seal process. While it may be easier to assemble a cell with the non-woven mesh as the inner layer next to the electrode, the non-woven material may instead, if desired, be provided as the outer layer. The laminate 49b and 50b and the laminate 67 and 68 should be thin enough to maintain high rate performance of the cell 10. Thus, the layers 49b and 50b are preferrably sized to have a combined thickness of less than about 0.005 inch. Likewise, the combined thickness of the layers 67 and 68 should also be about this thickness.

When the cell temperature rises, the lower melting point microporous film will begin to melt to stop or substantially block ion flow while the non-woven material is provided to advantageously maintain structural integrity of the separator so that gaps do not form in the separator which may worsen the short circuit condition and so that mechanical isolation of the anode and cathode is maintained. The microporous membrane is provided to advantageously provide good resistance to puncture by particles both during normal operation and short circuit conditions while the non-woven material is provided to advantageously provide good strength and tear resistance. While films tend to split along the machine direction, the laminate of both the film and the non-woven material of this embodiment of the present invention is also provided to advantageously provide good mechanical strength in both the machine and transverse directions. The combination of the polypropylene non-woven material with the polyethylene membrane is further attactive as both of these materials are commercially available and lend themselves to ease of manufacture without, for example, the requirement of an extra coating process or the like. The melting point of the non-woven material being at least about 10° C. higher than that of the microporous film material so that its melting point is not reached, it is provided to maintain the physical integrity of the separator material as the microporous film begins to melt, shuts down ion flow, and accordingly prevents the temperature from rising further, before the melting point of the non-woven material is reached.

This embodiment of the present invention is illustrated further by the following example.

EXAMPLE I

Lithium/silver vanadium oxide cells with a multiplate configuration were built using a pair of laminate separators each composed of a layer of non-woven polypropylene mesh and a layer of microporous polyethylene film. The separators were applied to the anode and to the cathode respectively with the non-woven material on the inside. Control cells using a pair of laminates each comprising a layer of non-woven polypropylene and a polypropylene membrane were also built and applied to the anode and cathode respectively with the non-woven material on the inside. The active surface area of each of the cells was about 90 square centimeters. Table I shows a comparison of the performance and the short circuit characteristics of the cell.

TABLE I

| TEST TYPE | CONTROL SEPARATOR | PRESENT INVENTION SEPARATOR |
| --- | --- | --- |
| 2.0 amps pulse discharge to a 2.0 volt limit | 2.19 amp - hr. | 2.15 amp - hr. |
| Short circuit peak temperature on the outer surface of the case at room temperature | 133° C. | 112° C. |
| Peak current at time of short circuit | 15 amps | 12 amps |

The above results show that the cell performance is not substantially different in the capacity that was delivered to 2.0 volts under a 2.0 amp pulse scheme. The peak temperature on the outer surface of the case under short circuit was lowered by about 20° C. to thereby provide an increased margin of safety for cells under external abuse or internal failure conditions. While the internal temperature will be higher than the external temperature, a lower external temperture indicates a reduction in the internal temperature. In addition to providing an increased margin of safety as indicated above without significantly sacrificing performance, the separator of the present invention is also provided to maintain structural integrity including good strength, tear resistance, and puncture resistance to better insure that any short circuit that developes will not be worsened and will be stopped before the melting temperature of lithium is reached whereby the chances of cell rupture are reduced.

Figure 4:
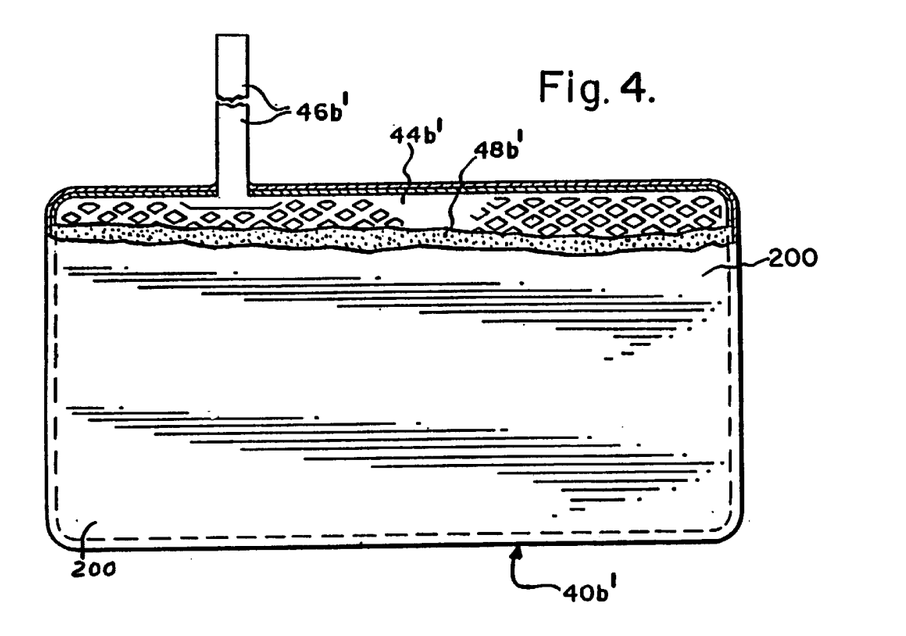
FIG. 4 is a view similar to FIG. 2 showing a thermal protection separator according to another form of the present invention.
Figure 5:
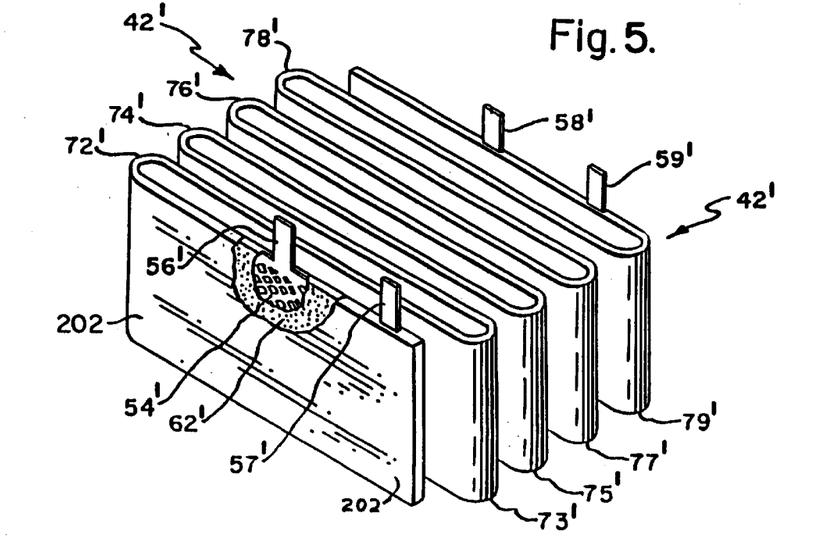
FIG. 5 is a perspective view, with parts removed, of the anode of the battery of FIG. 4.

FIGS. 4 and 5 illustrate a thermal protection separator according to another embodiment of the present invention wherein the separator comprises the combination of polyethylene on or operatively associated with one of the cell electrodes, i.e. anode or cathode, and polypropylene on or operatively associated with the other of the cell electrodes. The polyethylene component has the lower melting point, i.e. about 135° C., whereas the polypropylene has the higher melting point, i.e. about 150° C. One advantage of the separator according to this embodiment, in addition to enhanced cell safety, is preventing rupture on short circuit. Another advantage is a relatively lower short circuit peak temperature on the outer surface of the battery case.

In FIGS. 4 and 5 components similar to those of the previous embodiment are identified by the same reference numerals provided with a prime designation. According to this embodiment, cathode 40b' is provided with a separator component 200 thereon which can be of polyethylene material. Component 200 can be in the form of a layer applied to the cathode electrode in a manner similar to the layers in the previous embodiment. Anode 42' is provided with a separator component 202 thereon which can be of polypropylene material. Component 202 can be in the form of a layer applied to the anode electrode in a manner similar to the layers in the previous embodiment. Alternatively, component 200 can be of polypropylene material and component 202 can be of polyethylene material. Thus each component 200 and 202 can be of either polyethylene or polypropylene material, the only requirement being that one of the battery or cell electrodes, i.e. anode or cathode, have a polyethylene separator component thereon and the other electrode have a polypropylene separator component thereon.

Furthermore, both of the components 200 and 202 can be in the form of a microporous film, both components can be in the form of a non-woven mesh or one component can be microporous and the other component non-woven. The terms "microporous" and "non-woven" have the same meanings as used in connection with the previous embodiment. Another alternative is to have one component in the form of a laminate of film and non-woven, the laminate providing the advantage of greater mechanical strength. In these various alternatives, the polyethylene and polypropylene materials are interchangeable, so long as polyethylene is on one battery or cell electrode and polypropylene is on the other battery or cell electrode. Parameters such as pore size and component or layer thickness are the same as in the previous embodiment.

When the cell temperature rises, the polyethylene separator component when beginning to melt in response to a rise in cell temperature to the melting point thereof serves to stop or substantially block ion flow therethrough. At the same time the polypropylene separator component, which has the higher melting point, serves to maintain structural integrity of the separator so as to prevent formation of gaps in the separator and thereby maintain mechanical isolation of the anode and the cathode.

This embodiment of the present invention is illustrated further by the following example:

EXAMPLE II

Figure 6:
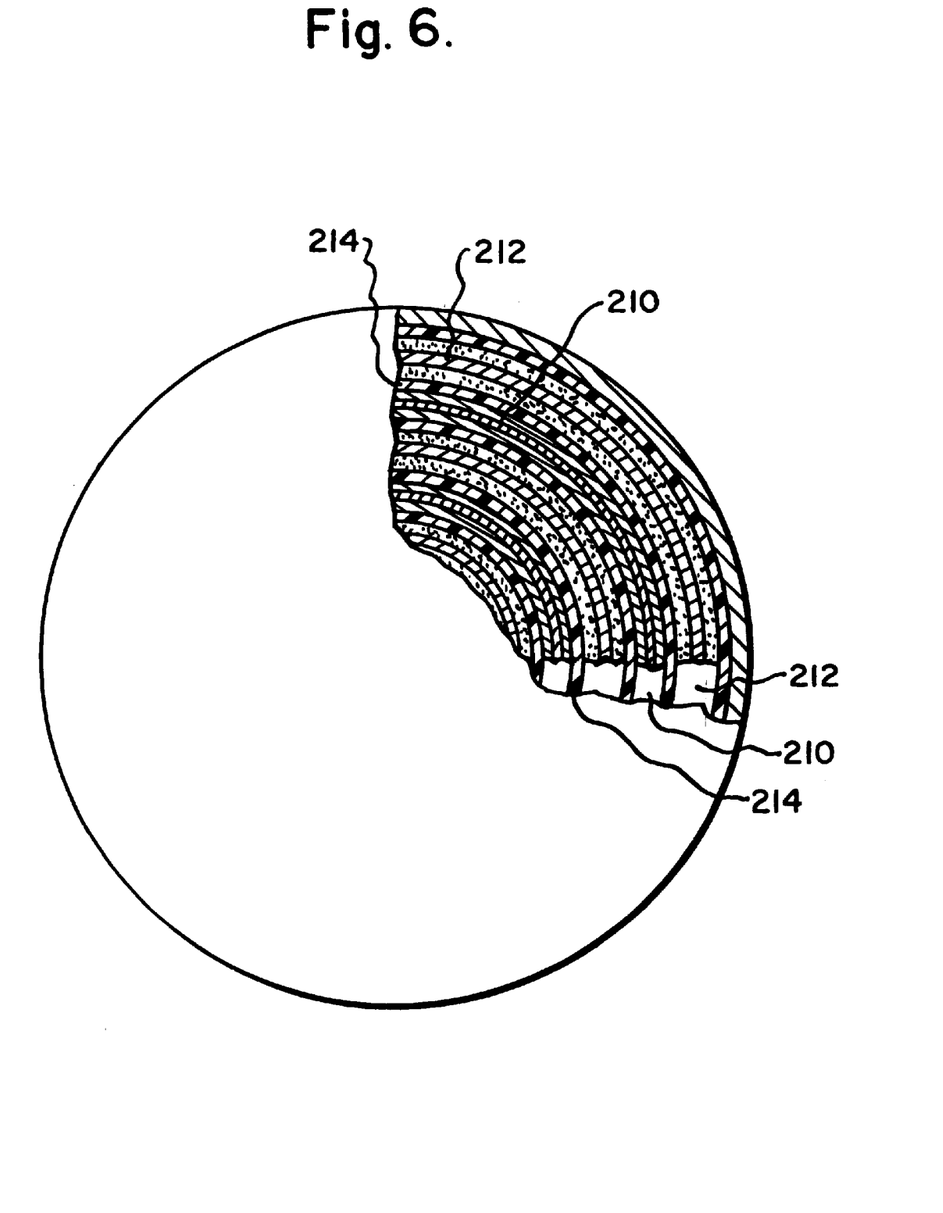
FIG. 6 is a sectional view of a cell of spirally wound configuration including the thermal protection separator of the present invention.

Lithium/silver vanadium oxide cells with a spirally wound configuration were built. A typical anode consists of lithium pressed on either side of a current collector equipped with a tab. In particular, the anode is in the form of an elongated rectangular strip with the tab extending laterally outwardly from one long edge of the strip and adjacent one end. A typical cathode consists of cathode material, in this case silver vanadium oxide, pressed on either side of a current collector. In particular, the cathode is in the form of an elongated rectangular strip of approximately the same length and width as the anode, and the cathode can be provided with two laterally extending tabs located inwardly of corresponding ends of the strip. The separator consists of two strips of material cut in rectangular pieces. In particular, each separator strip has a length approximately twice that of the anode or cathode and a width approximately the same as that of the anode or cathode. The assembly is made by stacking the separator pieces together and folding the combination of separator pieces around the cathode so as to sandwich the cathode therebetween. Then the anode is placed on top of the sandwich or stack. This assembly is then wound into a spirally wound cell stack assembly as shown in FIG. 6 to provide the final cell configuration including anode 210, cathode 212 and the two layer separator combination 214. The illustration is for a D size cell, but the same configurations with different dimensions can be used for other cell sizes. Cells in a ⅔A size were assembled using two separator configurations. One group of cells used one layer of polyethylene microporous film and one layer of a polypropylene laminate consisting of a polypropylene film laminated to a polypropylene non-woven layer. The second set of cells contained two layers of the polypropylene laminate film to serve as a control. The cells were subjected to short circuit testing where a direct short of less than 10 milliohms resistance was applied at room temperature. The results are summarized in Table II.

TABLE II

| TEST TYPE | CONTROL SEPARATOR | PRESENT INVENTION SEPARATOR |
|---|---|---|
| Short circuit peak temperature on the outer case surface at room temperature | 130.5° C. | 107.5° C. |
| Peak current at time of short circuit | 6.7 amperes | 6.2 amperes |
| Observations | Case bulged, cell vented at glass to metal seal | Case bulged, no leak or vent |

The example shows that maintaining lower cell temperature during a short circuit is advantageous. The cells with the separator combination according to this embodiment of the present invention did not leak or vent while the cells with the control separator vented, expelling flammable electrolyte.

The present invention is not limited to lithium batteries but is meant to include suitable separators for batteries or cells having other alkali metal anodes wherein the separator is composed of at least one component or layer having a melting point which is less than about 135° and at least one component or layer having a melting point which is at least about 10° C. higher than the melting point of the film, one form of the separator including the combination of microporous film and non-woven material and the other form including polyethylene on one electrode and polypropylene on the other electrode.

It is to be understood that the invention is by no means limited to the specific embodiments which have been illustrated and described herein and that various modifications thereof may indeed be made which come within the scope of the present invention as defined by the appended claims.

What is claimed is:

1. A cell for delivering high current pulses and rapidly recovering the cell open circuit voltage comprising a casing, an alkali metal anode means in said casing, a cathode means in said casing, an electrolyte in said casing and between and in contact with said anode means and said cathode means, means for providing electrical connection to said anode means, means for providing electrical connection to said cathode means, and means for separating said anode means and said cathode means, said separating means comprising the combination of a polyethylene component operatively on said anode means and a polypropylene component operatively on said cathode means, said polyethylene component and said polypropylene component being separate and distinct from each other, said polyethylene component when beginning to melt in response to a rise in cell temperature to the melting point thereof serving to stop or substantially block ion flow therethrough and said polypropylene component serving to maintain structural integrity of said separating means so as to prevent formation of gaps in said separating means and thereby maintain mechanical isolation of said anode means and said cathode means.

2. A cell according to claim 1, wherein said polyethylene component comprises a microporous film.

3. A cell according to claim 1, wherein said polyproylene component comprises a microporous film.

4. A cell according to claim 1, wherein said polypropylene component comprises a laminate of one layer of nonwoven material and one layer of microporous film.

5. A cell according to claim 1, wherein said anode means is a lithium anode.

6. A cell according to claim 1, wherein said cathode means is a solid cathode and said electrolyte is a liquid organic electrolyte.

7. A method for limiting temperature rise in an alkali metal anode battery cell due to a short circuit condition, said battery cell delivering high current pulses and rapidly recovering the cell open circuit voltage, comprising providing on the battery cell anode electrode a separator component which is of polyethylene material and providing on the battery cell cathode electrode a separator component which is of polypropylene material, said steps of providing said separator components being performed in a manner maintaining said separator components separate and distinct from each other, said polyethylene component when beginning to melt in response to a rise in cell temperature to the melting point thereof serving to stop or substantially block ion flow therethrough and said polypropylene component serving to maintain structural integrity thereof so as to prevent formation of gaps therein and thereby maintain mechanical isolation of the battery cell electrodes.

8. A method according to claim 7, wherein said polyethylene component comprises a microporous film.

9. A method according to claim 7, wherein said polypropylene component comprises a microporous film.

10. A method according to claim 7, wherein said polypropylene component comprises a laminate of one layer of nonwoven material and one layer of microporous film.

11. A method according to claim 7, wherein the anode electrode of said battery cell is a lithium anode.

12. A method according to claim 7, wherein the cathode electrode,of said battery cell is a solid cathode and the electrolyte is a liquid organic electrolyte.

13. A cell according to claim 1, wherein said cell is a primary cell.

14. A method according to claim 7, wherein said battery cell is a primary battery cell.

* * * * *